United States Patent [19]

Barnich

[11] 4,146,782

[45] Mar. 27, 1979

[54] DECODER SYSTEM FOR LIGHT PEN BAR CODE READER

[75] Inventor: Richard G. Barnich, Saline, Mich.

[73] Assignee: Process Computer Systems, Inc., Saline, Mich.

[21] Appl. No.: 821,985

[22] Filed: Aug. 5, 1977

[51] Int. Cl.² .................... G06K 7/10; G06K 7/14
[52] U.S. Cl. .................... 235/472; 235/463; 235/466
[58] Field of Search ............ 235/463, 464, 466, 472, 235/494, 487, 441, 449; 250/566, 568, 569

[56] References Cited

U.S. PATENT DOCUMENTS

| | | | |
|---|---|---|---|
| 3,701,097 | 10/1972 | Wolff | 235/463 |
| 3,744,026 | 7/1973 | Wolff | 235/463 |
| 3,761,685 | 9/1973 | Alpert | 235/466 |
| 3,783,245 | 1/1974 | Howell | 235/466 |
| 3,854,036 | 12/1974 | Gupta | 235/463 |
| 3,991,299 | 11/1976 | Chadima | 260/555 |

*Primary Examiner*—Robert M. Kilgore

*Attorney, Agent, or Firm*—Krass & Young

[57] ABSTRACT

A manually supported reader for a bar code which comprises a plurality of parallel bars of varying widths employs an optical detector which generates an electrical output signal which is a function of the code as the detector is moved. The detector comprises a light source and a light sensor, optically arranged to reflect light off of that part of the bar code with which it is in contact, thereby varying the output signal of the detector each time a boundary of one of the bars within the code is traversed. A decoding network receives the output signal from the detector and determines the time required to traverse each successive bar. A signal associated with the traversal of each bar is compared with an internally generated criterian. As a result of the comparison, the bar associated therewith is classified as to its width. Based on that classification, the criterian is recalculated for comparison with the signal associated with the next bar scanned. The decoding circuitry can be implemented within computer software or hard wired.

5 Claims, 1 Drawing Figure

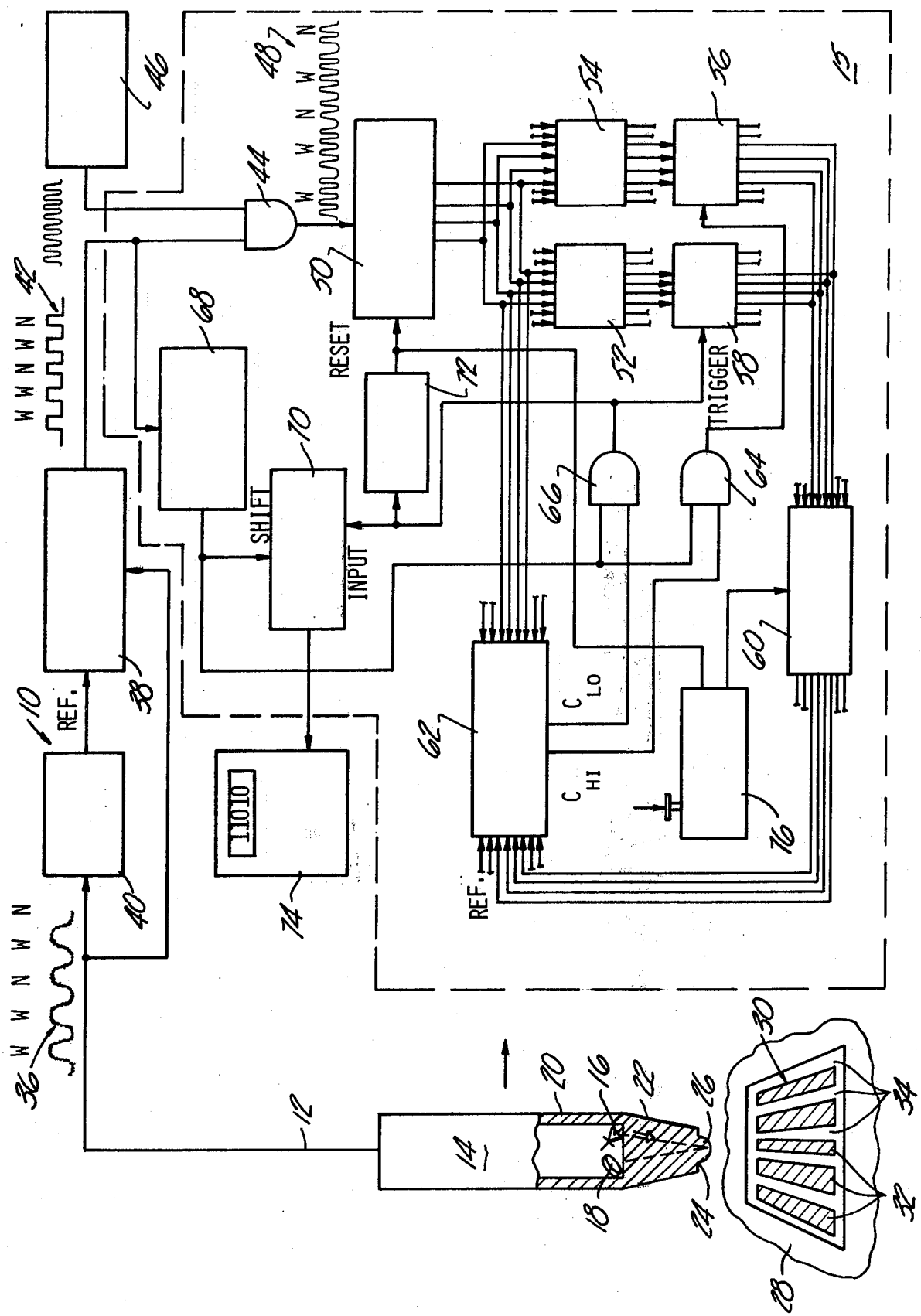

DECODER SYSTEM FOR LIGHT PEN BAR CODE READER

BACKGROUND OF THE INVENTION

1. Field of the Invention

This invention relates to readers for bar codes which are characterized by a plurality of bars having discrete variations for encoding information therein, and more particularly, to readers which characteristically scan such codes at a non-uniform rate.

2. Prior Art

Bar codes and their associated readers are widely used to facilitate manufacturing, shipment, inventory control of diverse products, such as consumer goods, particularly where large volumes of merchandise are handled. As labor content increases for relatively low priced items, minimization of per piece handling is an economic necessity. The use of bar codes has also arisen from the need for improved efficiencies in light of increased informational content which must be imprinted on the products. This problem is acutely evident in the retailing of foodstuffs where such information as price, date of manufacture, origin and the like is necessitated by law and/or competition.

Numerous schemes of reading bar codes have been proffered, but most have had major shortcomings. A major problem area is in the actual scanning of the bar code. Most systems "read" the information encoded within the series of bars which constitute the code, by detecting the width of successive bars and classifying them according to that system's particular decoding scheme. To obtain an accurate reading, a sensor must traverse the code at a predictable or uniform rate. Accordingly, to reduce undersirable scan-rate variations, complex mechanisms have been developed to pass a sensor by a product bearing a code at a uniform rate. These mechanisms are typically extremely costly and impractical for many applications.

Simple systems have been devised which employ hand held sensors. Being hand held or guided, such readers virtually inherently will scan at a non-uniform rate and thus introduce inaccuracies despite a concerted attempt by the operator not to do so. When passing a hand (and sensor) over a code, there is a human tendency to accelerate or de-accelerate even when making a concious attempt to maintain a constant velocity.

It would be desirable to devise a sensor and decoder which is intended for hand held operation which would compensate for the seemingly inherent inability of humans to move their hands linerally at a uniform rate. A principal object of the present invention is such a decoder system which will accurately detect conventional bar codes at non-uniform read rates.

SUMMARY OF THE INVENTION

The present invention comprises a bar code reader having a sensor adapted to be hand held and manually scanned over bar codes which have been imprinted upon consumer products or the like. Manual scanning allows great flexibility in application and permits bar code scanning systems to be applied to irregularly shaped or heretofore inaccessible articles.

The present invention overcomes shortcomings in the prior art by eliminating the need for a constant scan rate over the entire bar code. The prior art assumes in its logic networks that the scan rate is uniform, and it must be so, to get an accurate reading. The present invention assumes only that the change in speed or read rate between any two contiguous bars will be relatively small, thus allowing use of a hand held sensor or code where the prior art did not.

The reader comprises a sensor which is adapted to be manually moved across the bar code perpendicularly to the direction of extension of the bands. The sensor has an electric output signal which varies as a function of the properties of that portion of the code being instantaneously scanned. The reader also has a decoding network which receives the electric signal from the sensor, as it transverses a band, compares that signal with a criterian (c) and based on the results of that comparison, identifies the band so transversed as being within one of the fixed classifications. The C value is then recalculated for comparison with the signal associated with the traversal of a succeeding band.

In the preferred embodiment, the characteristic of the bar code that is being detected is its color, or more precisely, its light reflectivity properties. The bar code is made up of alternating dark colored bands and light colored spacing lines of uniform width. Information is encoded only within the bands, but it is comtemplated that it could be encoded within the bars and/or bands. The sensor is an optic point scanner which detects the color of the surface of the bar code being instantaneously scanned. The output signal of the sensor (after wave shaping to eliminate spurious variations) is substantially a square wave, being high when the band being scanned is relatively dark and low when the line being scanned is light. While scanning the code, as the sensor moves from a dark band to a light line or from a light line to a dark band, there is a corresponding sensor output transition from high to low or low to high respectively. The reader further comprises a decoding circuit which detects the period between successive transitions. The bar code information is thus encoded in the periods in which the output signal is high.

For simplicity, the preferred embodiment employs only two classifications of bar code band widths, namely wide (w) and narrow (n) having a ratio of 3:1. It is contemplated that more classifications could be used, however, the necessary logic circuitry would be burdensome to disclose in detail, even though the fundamental principles would be the same. Accordingly, at any given scan rate, there are only two possible periods between transitions corresponding with a wide band and a narrow band. The C value is calculated to always be intermediate these two possible periods. Therefore, when a band is traversed (at a scan rate that is substantially equal to that of the prior band), the resulting period is compared with the C value which was calculated as a function (either X0.5 or X2) of that prior period. If that period exceeds the C value, it is classified as wide and if that period is less than the C value, it is classified as narrow. From this classification, the C value is recalculated and compared with the following period. From the above discussion, it can be seen that the scan rate may fluctuate during the overall scan, but as long as incremental rate change (between contiguous bands) is less than 150%, the resulting classification will be true.

Other objectives, advantages and applications of the present invention will be made apparent by the following detailed description of a preferred embodiment of the invention. The description makes reference to the accompanying drawing in which:

FIG. 1 is a schematic diagram of a bar code reader embodying the present invention illustrating a sample bar code in perspective view, the sensor being broken away to show internal details.

Referring to FIG. 1, a bar code reader 10 comprises a flexible conductive cable 12 interconnecting a light pen 14 and decoding circuitry 15. The light pen 14 has a light emitting diode (LED) 16 serving as a light source and a photo cell 18 which ultimately receives the light emitted from the LED 16. The light pen comprises an elongated cylindrical housing 20 terminating in one end in a frustoconical translucent ruby lens 22. The bottommost surface of the lens 22 has a concave cavity 24 which mates with a transparent roller tip 26. In application, the pen 14 is hand held and the roller tip 26 placed in contact with the surface 28 to be scanned and displaced substantially linearly, parallel to said surface 28 while being held substantially normal to said surface 28. The LED 16 and photo cell 18 are so oriented that the LED emits light downwardly through the lens 22 and the ball tip 26 on to the surface 28 being scanned. The light then reflects from said surface 28 back through the roller tip 26 and lens 22 and is focused upon the photo cell 18. The light output of the LED 16 is substantially constant. The output of the photo cell 18 is a function of the light is receives. Accordingly, the amount of light from the LED 16 reflected back to the photo cell 18 and thus the photo cell 18 output is a function of the reflective properties of the surface 28 being scanned.

The present invention contemplates scanning bar codes 30 which comprise a series of parallel dark bars 32 separated by light spacing lines 34. The bars 32 vary from one another in width in fixed ratios or classifications. A simple five bar code 30 having only two widths of bars 32 is illustrated, however, it is contemplated that virtually any number of combinations may be employed depending upon the amount of information contained in the code 30. In the example, the ratio of widths of the wide bars (w) to the narrow bars (n) is three:one. The illustrated code therefore (which reads from left to right) would be w—w—n—w—n. This code will be carried through the discussion of the logic circuitry below. As the pen 14 traverses the bar code 30 perpendicularly to the direction of extension of the bands 32 it will generate a signal on cable 12 which is high when the roller tip 26 is on a dark bar 32 and low when the roller tip 26 is on light line 34. The wave form 36 resulting from a scan of all five bars 32 within the code 30 is illustrated. The width of each bar 32 determines the length of time during which the wave form 36 is high and the width of the spacing lines 34 determine the length of time the wave form 36 is low. In the illustrated example, there is no information encoded in the lines 34 and accordingly they are of equal arbitrary width, but it is contemplated that information could be encoded within the bars 32 only, the lines 34 only or both the lines 34 and the bars 32 simultaneously.

The output of the light pen 14 is fed to the input of a comparator 38 directly and to the reference input of comparator 38 through an automatic gain control (AGC) circuit 40. The AGC circuit 40 maintains the reference input of the comparator 38 within predetermined high and low limits, eliminating any spurious fluctuations as illustrated in wave form 36. The output of comparator 38 is a square wave of variable pulse duration as indicated in wave form 42. The individual pulse durations depend upon the width of the respective bar 32 within the code 30 and the rate at which that bar is scanned. The comparator 38 feeds one of the inputs of AND gate 44. A clock 46 feeds the other input of AND gate 44. Although the period of the clock pulses is arbitrary, it should be at least two orders of magnitude less than the period of the narrowest pulse n (which corresponds with the narrowest bars 32 of bar code 30) to assure a crisp, well defined pulse train from the AND gate 44. The output of AND gate 44 will be a series of pulse bursts, the period of each burst corresponding to the period of the corresponding pulse from comparator 38. The output wave form 48 of AND gate 44 is illustrated. Continuing the example, assuming that pulses w of wave form 42 are each three hundred times the period of a clock 46 pulse and pulses n of wave form 42 are each one hundred times the period of a clock 46 pulse, bursts w and n of wave form 48 would each consist of three hundred and one hundred clock pulses respectively.

The output of AND gate 44 feeds counter 50 which summates in binary the total number of pulses received per burst (until receiving a reset pulse). The output of counter 50 is fed in parallel (as opposed to sequentially) to a divider network 52 and a multiplier network 54 which are interconnected in parallel. The multiplier 54 and divider 52 are each fed in series to separate gates 56 and 58 respectively. The outputs of gates 56 and 58 reconverge and are commonly fed into the input of criterian (c) register 60. The output of register 60 feeds the reference input of comparator 62. The output of counter 50 feeds the sample input of comparator 62. Comparator 62 has two outputs, one (labeled C HI) produces an output pulse if the number in the c register 60 is greater than that of the sample input and the other (labeled C LO) produces an output pulse if the number in the C register 60 is less than that in the sample input from counter 50. The C HI output of comparator 62 feeds one input of AND gate 64 and the C LO output of comparator 62 feeds one input of AND gate 66.

The output of comparator 38 also feeds the input of a trailing edge detector 68 which produces a pulse from its output each time there is a transition from high to low in the output waveform 42 of comparator 38. The output of the trailing edge detector 68 feeds the remaining inputs of both AND gates 64 and 66. The output of AND gate 66 feeds the trigger input of gate 58 and the output of AND gate 64 feeds the trigger input of gate 56. The output of AND gate 66 also feeds the input of shift register 70 as well as the reset input of counter 50 through delay circuit 72. The output of the trailing edge detector 68 also feeds the shift input of shift register 70. A utilization device 74 is loaded from the output of shift register 70.

Continuing the example, as the light pen completes traversal of the first (lefthandmost) bar 32 of bar code 30, the counter, which had been previously reset, will have counted 300 clock pulses inasmuch as the first bar 32 is wide. This binary information is fed into the sample input of comparator 62 which compares it with the contents of the C register 60 which is clear at this point inasmuch as it is manually reset by a reset circuit 76 at the completion of each scan. The reset circuit 76 also is connected to and resets the counter 50 upon termination of the scan. Accordingly, the sample input will exceed C and thus a pulse will emanate from the C LO output of comparator 62 to AND gate 66. Simultaneously, as the pen 14 detects the boundary between the first bar 32 and line 34, there will be a corresponding transition from high to low in wave form 42, producing an output pulse from the trailing edge detector to AND gate 66. AND gate 66 thus has a pulse at both inputs and produces an output pulse which registers as a binary "1" in the shift register 70 which in turn is displayed in the first (lefthandmost) digit of the utilization device output display. The same output pulse from AND gate 66 triggers 58, allowing loading of the counter 50 accumulation (300) into the C register after passing through divider network 52. C register 60 will thus be loaded with a binary value of 150. Finally, the pulse from the trailing edge detector 68 shifts the shift register once and the output signal from AND gate 66, after a delay resets counter. The width (w) of the first bar 32 has thus been digitally encoded as a binary 1 within the shift register and the criteria value has been recalculated from 0 to 150.

Again continuing the example, as the light pen 14 crosses the boundary between the first line 34 and the second bar 32 the counter will begin counting the pulses within the second burst in wave form 48. Upon completion of transversal of the second bar 32, the counter again will be at 300 (the second bar 32 is also wide) and the trailing edge detector will have an output pulse. Comparator 62 will compare the reference input (C value of 150) from C register 60 to the sample input (300) from the counter 50. Again, C is low and the AND gate 66 will produce an output pulse, registering a binary 1 within the shift register 70 utilization device 74. The shift register 70 will shift once and gate 58 will be triggered, recalculating C (which again will be 150) and loading that binary number into C register 60.

As the pen 14 completes traversal of the third bar 32 (which is narrow), the counter will only have accumulated 100, thus within comparator 62, C will be high and gate 56 will be triggered by an output pulse from AND gate 64. There is no input to the shift register 70, thus a binary 0 is entered and a pulse from the trailing edge detector 68 shifts the register. When gate 56 is triggered, C is recalculated to become 200 and that binary number is loaded into the C register 60.

This logic cycle is repeated until all the bars 32 have been traversed. At that point, the shift register 70 has the decoded information stored within it and the utilization device 74 has a binary or digital display read out. It is contemplated however that the utilization device 74 could be a computer memory without a visual display feature. When reuse is desired, reset circuit 76 is actuated and the C register 60 and counter 50 are cleared. The C value upon the first bar 32 of a code 30 will thus always be zero. Accordingly, and in agreement with the codes 50 in use in the current art, the first bar 32 of each code 30 must (or at least will always be read as) wide.

The decoding circuitry, including the comparison means can be implemented within computer software or can be hard wired at the option of the user. It is to be understood that the invention has been described with reference to a specific illustrative embodiment and the above-mentioned modifications and variations herefrom could be easily implemented by a technician skilled in the art.

The embodiments of the invention in which an exclusive property or privilege is claimed are defined as follows:

1. A reader for bar codes which consist of a plurality of parallel bands of widths which fall within one of a plurality of fixed classifications comprising: a sensor adapted to be manually moved across the bar code perpendicularly to the direction of extension of the bands and having an electric output signal with a characteristic which varies as a function of the properties of that portion of the code being instantaneously scanned; decoding means operative to receive said electric output signal, generate a signal having a value which is a function of the time interval required for the sensor to traverse a band; storage means for a criterion value; comparator means operative to compare the criterion value retained in said storage means with said signal associated with said time to traverse a band, the output of said comparator means assigning said first band within one of said classifications; and means for recalculating said criterion value based on said signal having a value which is a function of said time interval and the output of the comparator means; whereby as each band after the first is scanned, the signal associated with that band is compared with a criterion value which is a function of the signal associated with the preceding band.

2. The apparatus as described in claim 1 further including a reset means operative to clear said criterion value storage means.

3. The apparatus as described in claim 1 wherein said sensor comprises a light source and photo detector, said light source and photo detector being optically arranged to reflect light off of a portion of said bar code.

4. The apparatus as described in claim 1 wherein the bands have widths which fall into one of two classifications and said means for recalculating said criterion value based on said signal having a value which is a function of said time interval and the output of the comparator means operates to generate a criterion value which is greater than the time interval required for the sensor to traverse the last band if that band was determined to be of a narrow width, and less than the time interval required for the sensor to traverse the last band if that band was determined to be of a narrow width, and less than the time interval required for the sensor to traverse the last band if the last band was determined to be of a wider width.

5. A reader for bar codes which consist of a plurality of parallel bands each having either a narrow or a wide width, comprising: a light pen adapted to be moved across the bar code and having an electric output signal with the characteristic which varies as a function of the properties of that portion of the code being instantaneously scanned; decoding means operative to receive said electrical output signal and to generate a signal having a value which is a function of the time interval required for the sensor to transverse a band; storage means for a criterion value; comparator means operative to compare to the stored criterion value with said signal having a value which is a function of the time interval required for the sensor to transverse a band and for generating one of two output signals, depending upon whether the time interval exceeds the criterion or is less than the criterion; and means for generating a revised criterion value signal based upon the output of the comparator means and the signal having a value which is a function of the time interval required for the sensor to transverse a bend, said criterion value signal being less than the signal value which is a function of the time interval required for the sensor to transverse a band if the output of the comparator means is indicative of a wide band, and said criterion value being greater than the value which is a function of the time interval required for the sensor to transverse a band if the output of the comparator is indicative of a narrow band.

* * * * *